Sept. 22, 1925.
T. B. McGRATH
FUSELAGE STRUCTURE
Filed Aug. 4, 1922
1,554,224
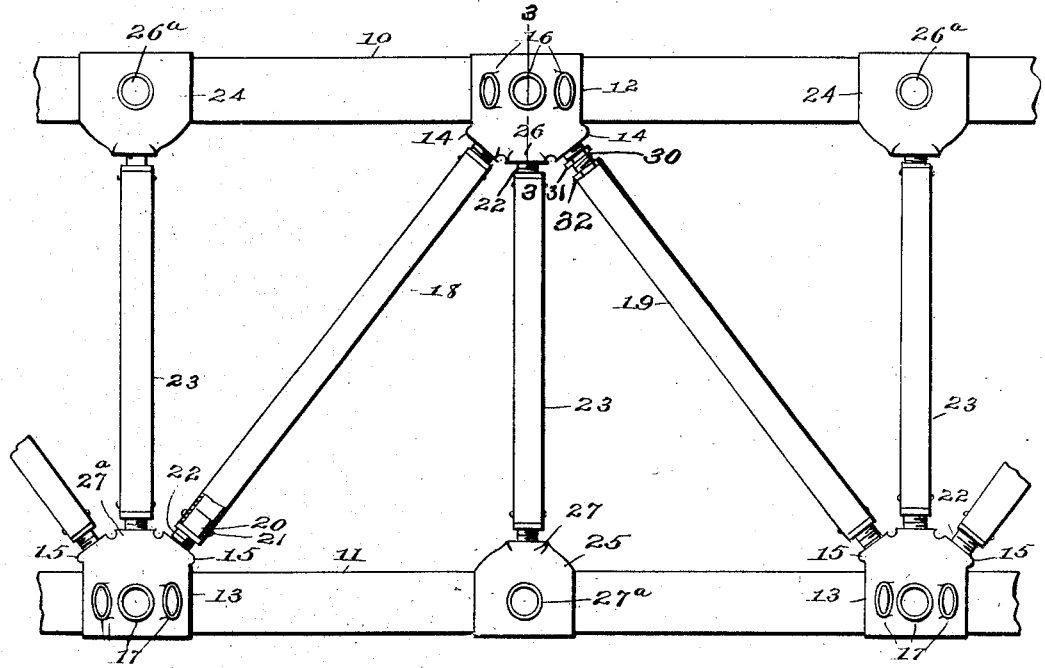
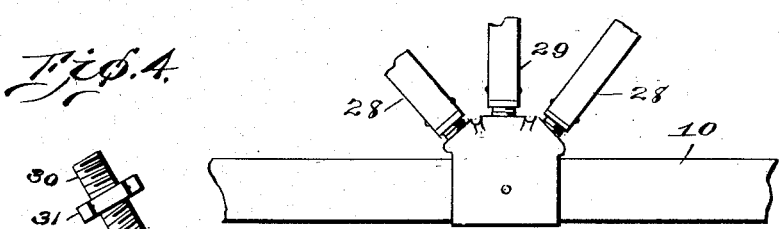
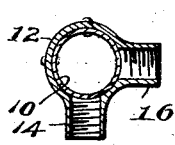
Inventor
Thos. B. McGrath
By Robert H. Young, Atty.

Patented Sept. 22, 1925.

1,554,224

UNITED STATES PATENT OFFICE.

THOMAS B. McGRATH, OF DAYTON, OHIO.

FUSELAGE STRUCTURE.

Application filed August 4, 1922. Serial No. 579,648.

*To all whom it may concern:*

Be it known that I, THOMAS B. McGRATH, a citizen of the United States, residing at Dayton, in the county of Montgomery and State of Ohio, have invented certain new and useful Improvements in Fuselage Structures, of which the following is a specification.

This invention relates to a fuselage structure in which the component parts may be readily assembled and adjusted.

The invention is hereinafter described in connection with the accompanying drawings, in which—

Fig. 1 is a side elevation of a portion of a fuselage structure embodying the invention;

Figure 2 is a plan view of a part of the fuselage structure; and

Figure 3 is a sectional view on the line 3—3 of Fig. 1.

Figure 4 is a detailed view partly in section of the component parts of my adjustable tubular member.

The numerals 10 and 11 designate the upper and lower longérons having spaced fittings 12 and 13 secured thereto. These fittings are preferably aluminum or bronze castings having six sockets formed therein. A set of three of these sockets 14 on the upper fitting and three sockets 15 on the lower fitting have their axes arranged in the vertical plane of the axes of the upper and lower longérons. The outer sockets of each fitting 14, 15 are arranged at an angle while the central sockets are vertically disposed. The fittings 12 and 13 are also provided with sets of three sockets 16 and 17 arranged horizontally to receive tubular members extending between the upper and the lower longérons.

The fittings 12 and 13 are arranged in staggered relation and the angularly disposed sockets thereof are connected by diagonal tubular members 18, 19. Each of these members is provided at either end with an interiorly fitted tubular block 20 held in place by bolts or rivets 21 and having an internally screw-threaded portion 22 adapted to receive one end of a right and left hand threaded connection 30, having a nut face 31 and held in adjustment by a jamb nut 32. Vertical tubular members 23 connect the central socket 14 or 15 with an auxiliary fitting 24 or 25. The latter are each provided with vertical and horizontal sockets 26, 27 and 26ª, 27ª, respectively.

Diagonal members 28 similar in construction to members 18, connect the outer sockets 16 with a like fitting on the opposite upper longéron and the fittings 13 of the lower longérons are connected in like manner. The central socket 16 is connected to an opposite socket 16 by a tubular member 29 and opposite connections 27ª and 27 are connected in like manner. All of the tubular members are provided at either end with interiorly fitted blocks similar to the blocks 20.

In assembling the truss formation to the longérons the various fittings are first secured in proper position. The screw threaded portions 20 of each component part of the tubular members is then screwed into the appropriate socket the coupling sleeve 31 being approximately in position. The sleeve 31 is then tightened to adjust the length of the tubular member the desired amount. In order to maintain proper adjustment at the connections the final adjustments may be distributed between the end threads 22 and the coupling sleeve 31. After the final adjustments have been made, the parts are locked in adjusted position by lock wires 32.

I claim:

1. A fuselage structure comprising, longérons, fittings attached to the upper and lower longérons in staggered relation, and rigid tubular members connecting said fittings, said tubular members consisting of component parts adjustably connected together.

2. A fuselage structure comprising, longérons, fittings attached to the upper and lower longérons, in staggered relation, said fittings having threaded sockets angularly disposed therein, tubular members having blocks secured to either end thereof provided with a threaded extension adapted to engage said sockets, and means for adjusting the effective length of said tubular members.

3. In a fuselage structure, longérons, fittings mounted on said longérons and provided with tubular sockets, tubular members adapted to adjustably connect said fittings, said tubular members each comprising a cylindrical tube, interiorly screw-threaded tubular block fixedly mounted in ends of said tube and exteriorly screw threaded block adapted to fit within said interiorly screw threaded block, said last named member being provided with suitable lock nuts.

4. In a fuselage structure, a fitting having vertically and horizontally disposed sockets and other sockets disposed at an angle to the vertically and horizontally disposed sockets adapted to receive truss-members.

In testimony whereof I affix my signature.

THOMAS B. McGRATH.